(12) United States Patent
Jauniaux et al.

(10) Patent No.: US 6,339,133 B1
(45) Date of Patent: Jan. 15, 2002

(54) EMERGENCY STOP OF A POLYMERIZATION IN THE GAS PHASE

(75) Inventors: Marc Jauniaux; Vincent Bouffioux, both of Brussels (BE)

(73) Assignee: Solvay Polyolefins Europe - Belgium, Brussels (BE)

(*) Notice: Subject to any disclaimer, the term of this patent is extended or adjusted under 35 U.S.C. 154(b) by 0 days.

(21) Appl. No.: 09/610,587
(22) Filed: Jul. 5, 2000
(51) Int. Cl.[7] .................................................. C08F 2/40
(52) U.S. Cl. .............................. 526/82; 526/84; 526/65
(58) Field of Search ............................... 526/82, 84, 65

(56) References Cited

U.S. PATENT DOCUMENTS 5,399,320 A * 3/1995 Craddock et al. ............ 422/138

* cited by examiner

Primary Examiner—David W. Wu
Assistant Examiner—William K. Cheung
(74) Attorney, Agent, or Firm—Venable; Marina V. Schneller

(57) ABSTRACT

Process for the emergency stopping of a polymerization reaction in the gas phase, comprising the injection of a poison of the reaction into a polymerization reactor and the evacuation of the gaseous content of the polymerization reactor via delaying means to a burner at the maximum limited feed rate, characterized in that the delaying means simultaneously serve to obtain a homogeneous distribution of the poison of the reaction inside the polymerization reactor so as to interrupt the polymerization reaction, and to regulate the flow of gasses evacuated to the burner so as not to exceed the maximum feed rate of the burner.

14 Claims, 2 Drawing Sheets

EMERGENCY STOP OF A POLYMERIZATION IN THE GAS PHASE

The present invention concerns a process for the emergency stopping of a polymerization reaction in the gas phase.

Processes for stopping olefin polymerization reactions are generally based on the use of a poison of the reaction (or deactivating agent) to rapidly interrupt the polymerization, for example in case of an electrical or technical failure of the recirculation and/or cooling system of the reaction in the gas phase. As these reactions are generally highly exothermic, the rapid interruption of the reaction is essential in order to avoid reaching the melting point and causing the agglomeration of the polymer, which would render the reactor, and hence the entire polymerization installation, temporarily unusable.

The document EP 0 136 029 proposes the introduction of a poison with the aid of an inert gas into a polymerization reactor. The authors admit that the evacuation to the open atmosphere of the gaseous reagent contained in the reactor, sometimes recommended, is ruled out both for ecological reasons and for reasons of human and equipment safety. One of the surest and simplest ways to eliminate the gaseous content of the reactor is to burn it off in a burner. But again, the authors note that the high rate of discharge downstream from the reactor could present a problem with the use of a burner. In fact, economic and technical considerations rule out the use of a burner when the discharge rate is as high as that required for the fast and complete evacuation of the gas contained in the reactor. No solution to this problem is given or suggested in this document.

The document EP 0553 908 presents a system which, in case of a failure of the recirculation compressor, uses part of the pressurized recirculated flow to drive the compressor and maintain the bed in the fluidized state, after which this low-discharge part of the flow can be burned off in a burner. However, this system is complex and is primarily adapted to the electrical, and to a lesser degree technical, failure of the compressor, but does not cover other situations requiring the emergency stopping of the reactor, such as for example a failure of the system for cooling the recirculated flow.

The object of the invention is therefore to offer a process for the emergency stopping of a polymerization reaction in the gas phase that eliminates the drawbacks presented above by allowing, first of all, the efficient and homogeneous introduction of a poison of the reaction into the reactor in order to deactivate the reagents, and secondly the evacuation, at a controlled rate, of the gaseous reagent (monomer) to a burner in order to burn it off without exceeding the maximum rate.

The present invention offers a process for the emergency stopping of a polymerization reaction in the gas phase comprising the injection of a poison of the reaction into a polymerization reactor and the evacuation of the gaseous content of the polymerization reactor via delaying means to a burner at the maximum limited feed rate characterized in that the delaying means simultaneously serve to obtain a homogeneous distribution of the poison of the reaction inside the polymerization reactor so as to interrupt the polymerization reaction, and to regulate the flow of the gasses evacuated to the burner so as not to exceed the maximum feed rate of the latter.

A first advantage of the present invention is being able to use a burner of normal capacity having a maximum feed rate substantially lower than the rate required in case of emergency, when fast evacuation of the gaseous content of the reactor is recommended. A second advantage of the present invention is being able to operate at the optimal rate of the burner so as to allow a complete combustion of the gaseous content of the reactor. Furthermore, when the polymerization is performed in several reactors, it is possible to delay the burning of the gaseous contents of the various reactors so as to be able to use the same burner for several reactors.

A first aspect of the present invention offers a process for the emergency stopping of a polymerization reaction in the gas phase in which the means for delaying the evacuation comprise a buffer reservoir, with a pressure lower than that prevailing in the polymerization reactor, placed between the polymerization reactor and the burner, and means for regulating the gas discharge rate at the outlet of the buffer reservoir, the contents of the reactor being homogeneously mixed with the poison of the reaction by a sudden expansion of the gasses contained in the polymerization reactor to the buffer reservoir by equalizing the pressure between said reactor and said reservoir, and the regulating means serving to reduce and to regulate the feed rate of the burner.

The use of a buffer reservoir results not only in the homogeneous distribution of the poison of the reaction and the regulation of the feed rate of the burner, but also in a reactor that is more quickly available for the possible start of a new polymerization reaction. This buffer reservoir has enough volume, for example a volume 0.5 to 5 times that of the polymerization reactor, to receive at least part of the gaseous content of the reactor. This volume is advantageously calculated as a function of the time available for equalizing the pressure between the polymerization reactor and the buffer reservoir before the melting temperature of the polymer is reached.

The prevailing pressure in the buffer reservoir will preferably be much lower than the initial pressure in the reactor, in order to obtain a maximum pressure gradient at the moment of the expansion. Ideally, the buffer reservoir is under slight pressure from an inert gas such as nitrogen. A pressurization of 0.01 to 1 barg produces good results.

The dispersion of the poison via expansion allows the stopping of the polymerization reaction, perceptible through a drop in the temperature of the reaction medium.

A second aspect of the present invention provides a process for the emergency stopping of a polymerization reaction in the gas phase in which the means for delaying the evacuation comprise a reservoir containing a carrier gas, with a pressure higher than that prevailing in the polymerization reactor, placed upstream from the polymerization reactor, and means for regulating the discharge rate at the outlet of the reactor, the contents of the reactor being homogeneously mixed with the poison of the reaction by the sudden expansion of the carrier gas in the reactor, and the regulating means serving to reduce and to regulate the feed rate of the burner, preferably to its optimum.

The reservoir containing the carrier gas upstream from the polymerization reactor is preferably under high pressure, such as for example a pressure 2 to 10 times higher than the initial pressure prevailing in the polymerization reactor.

The carrier gas is preferably an inert gas, for example nitrogen, helium, argon or their mixtures, or another type of gas or a mixture of these gasses. The carrier gas can be introduced separately, simultaneously, or in a mixture with the poison of the reaction. If it is introduced separately, it is injected upstream from the injection point of the poison, preferably at the inlet of the polymerization reactor, for example upstream from the distribution grid in a fluidized bed polymerization reactor When the carrier gas and the poison are introduced into reactor together or in a mixture, the injection preferably takes place under the distribution grid. It can also be done at several places along the height and/or on the periphery of the polymerization reactor.

The quantity of carrier gas introduced into the reactor must be at least enough to homogeneously distribute the poison of the reaction into the contents of the reactor and depends on the volume of the reactor and the pressure gradient between the carrier gas reservoir and the polymerization reactor before the expansion. However, since the quantity of carrier gas is added to the volume of reagent gas to be burned off in the burner and thus increases the time required for the complete burning of the evacuated gasses, care is taken to introduce only the minimum quantity essential to the homogeneous distribution of the poison in the reactor.

These two aspects of the present invention concern a polymerization reaction in the gas phase. It can be any reaction for polymerizing or copolymerizing one or more olefin and/or diolefin monomers in the gas phase, preferably in a fluidized bed, in any appropriate reactor or series of reactors, in the presence of any catalyst or catalytic system capable of polymerizing these monomers. Examples of these catalysts are those that are transition metal based, such as the Ziegler-Natta catalysts based on titanium complexes that can be supported, catalysts of the metallocene type or chromium oxide based catalysts supported on a silica based carrier. Preferably, these catalysts or catalytic systems can be deactivated, irreversibly or reversibly, by one or more deactivating agents or poisons.

Since the irreversible deactivating agent or agents do not allow the subsequent reactivation of the catalyst or the catalytic system (for example oxygen and air), a reversible deactivating agent, such as carbon monoxide, carbon dioxide and their mixtures, is preferably used. Other reversible deactivating agents such as water and alcohols, or irreversible deactivating agents such as aldehydes and ketones, can also be used. Preferably, those that are in the gaseous state under the conditions prevailing in the reactor will be used. Carbon monoxide, carbon dioxide and their mixtures provide particularly good results. The quantity of deactivating agent to be introduced into the polymerization reactor depends on the quantity of catalyst existing in the reactor. The deactivating agent will be used in stoichiometric excess relative to the transition metal present in the catalyst. Quantities of deactivating agent from 1.5 to 300, more particularly from 3 to 100 moles per mole of transition metal present in the catalyst work well.

The gasses evacuated from the polymerization reactor comprise so many actual gaseous substances, such as the reagents that have yet reacted, monomers and co-monomers such as olefins, diolefins, etc., one or more inert gasses such as nitrogen, argon, the deactivating agent such as CO and/or $CO_2$, solid substances in suspension such as oligomers and polymers in formation, the catalyst or catalytic system, particles issuing from the bed.

BRIEF DESCRIPTION OF DRAWINGS

The following examples in connection with FIGS. 1 and 2 represent the two embodiments that illustrate the present invention.

Figure 1:
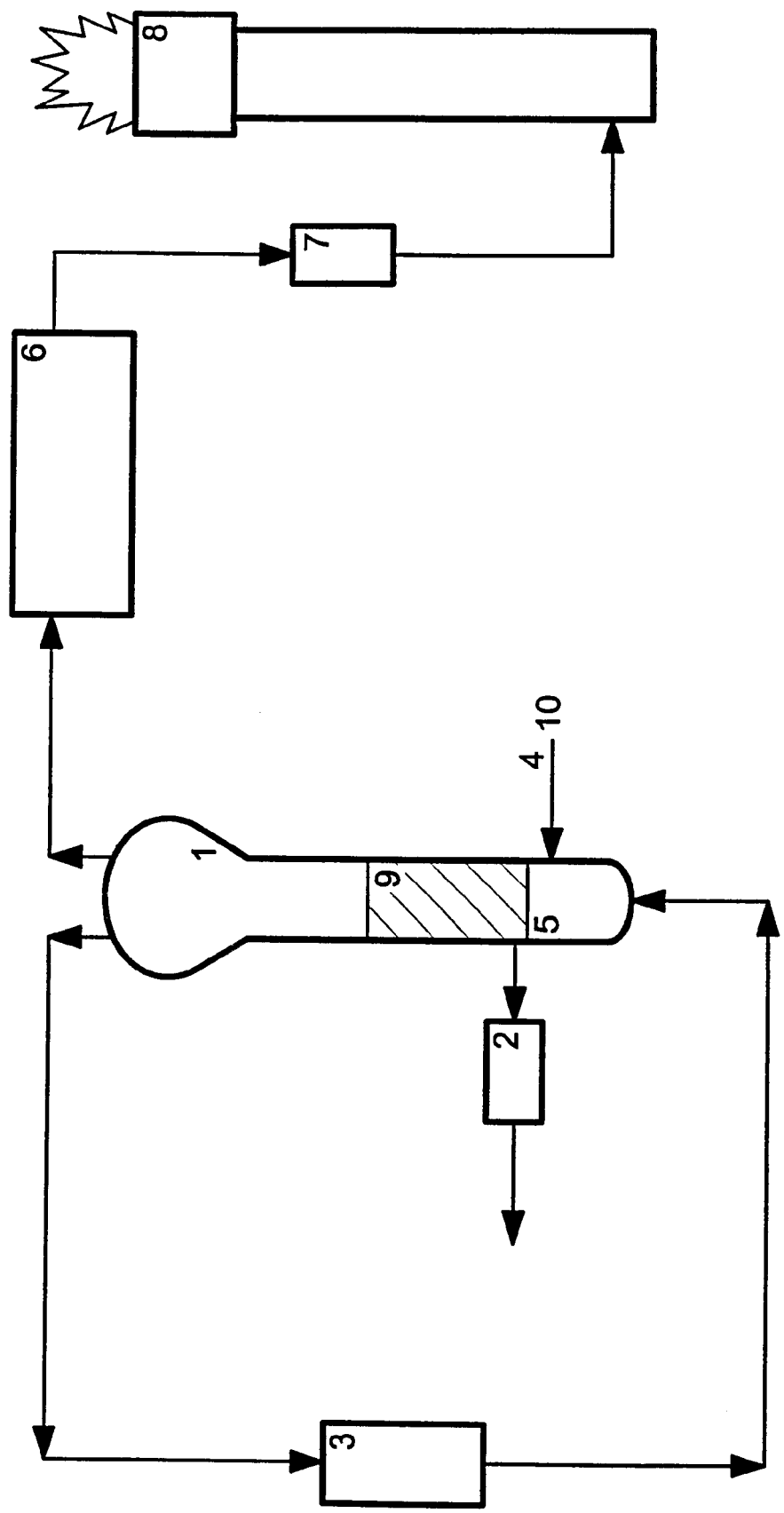
FIG. 1 represents the device of Example 1 and FIG. 2 represents the device of Example 2.

The polymerization installation common to these examples comprises a fluidized bed polymerization reactor (1) provided with a distribution grid (5) surmounted by a bed maintained in the fluidized state (9) by the injection under the grid of fresh reagents and of the flow of recirculated gas, previously compressed and cooled. The product of the polymerization is evacuated from the reactor by the evacuation device (2). The gaseous monomer is evacuated from the reactor and recirculates in a closed loop via the recirculation device (3). The burner (8) is connected to the top part of the reactor and the flow of evacuated gasses is regulated by the appropriate regulating means (7).

The maximum rate of the burner is 20 t/h.

EXAMPLE 1

Buffer Reservoir

The device installed in order to implement the first aspect of the present invention is represented by FIG. 1. This particular device also comprises a buffer reservoir (6) and a duct (4) that allows the introduction, under the distribution grid (5) of one or more deactivating agents conveyed by a carrier gas (10).

During an emergency stop of the polymerization reaction, for example the loss of the recirculation device 3, the gaseous content of the reactor must be evacuated before reaching the melting point of the polymer present in the reactor. The polymerization reaction is therefore deactivated through the introduction under the distribution grid of the reactor (5), through the duct (4), of the deactivating agent or agents conveyed by a carrier gas (10).

Initially, the polymerization reactor in operation is at a total pressure of 32 barg and the buffer reservoir is at 0.01 barg. During the emergency stop, the poison (CO) is introduced into the reactor uniformly along the entire height of the bed via the duct (4). In one of the most critical cases, the maximum duration allowed for the deactivation is 141 seconds, in order to prevent the melting of the product of the reaction inside the reactor. Without a buffer reservoir, this would result in an initial evacuation rate of the reagent gas ("blowdown") of 211 t/h, which is much too high given the capacity of the burner, whose maximum rate is 20 t/h (smokeless rate).

In order to delay this discharge, the buffer reservoir (6) is placed upstream from the burner, in order to contain all of the gas evacuated from the reactor during a "blowdown" and to ensure a maximum discharge to the burner of 20 t/h. The capacity of the buffer reservoir has been calculated to allow the depressurization in 141 seconds (achieving, in 141 seconds, the equalization of the reactor and the buffer reservoir to a pressure of 17 barg).

The dimensions of the buffer reservoir are the following

Diameter: 5,500 mm

Length: 22.9 m

Calculated pressure: 17 barg

Calculated temperature: 110° C.

Total volume 492 m$^3$

In summary, the CO conveyed underneath the distribution grid (5) of the reactor (in which the recirculation of gas has been interrupted) is, via the depressurization of the reactor through its equalization with the buffer reservoir (6), dispersed by the expansion of the gas throughout the fluidized bed in the reactor. The discharge rate of the reactor during the depressurization is 211 t/h. But the use of the buffer reservoir and the regulating means (7) makes it possible to keep the rate of the burner to 20 t/h.

EXAMPLE 2

Carrier Gas Reservoir

Figure 2:
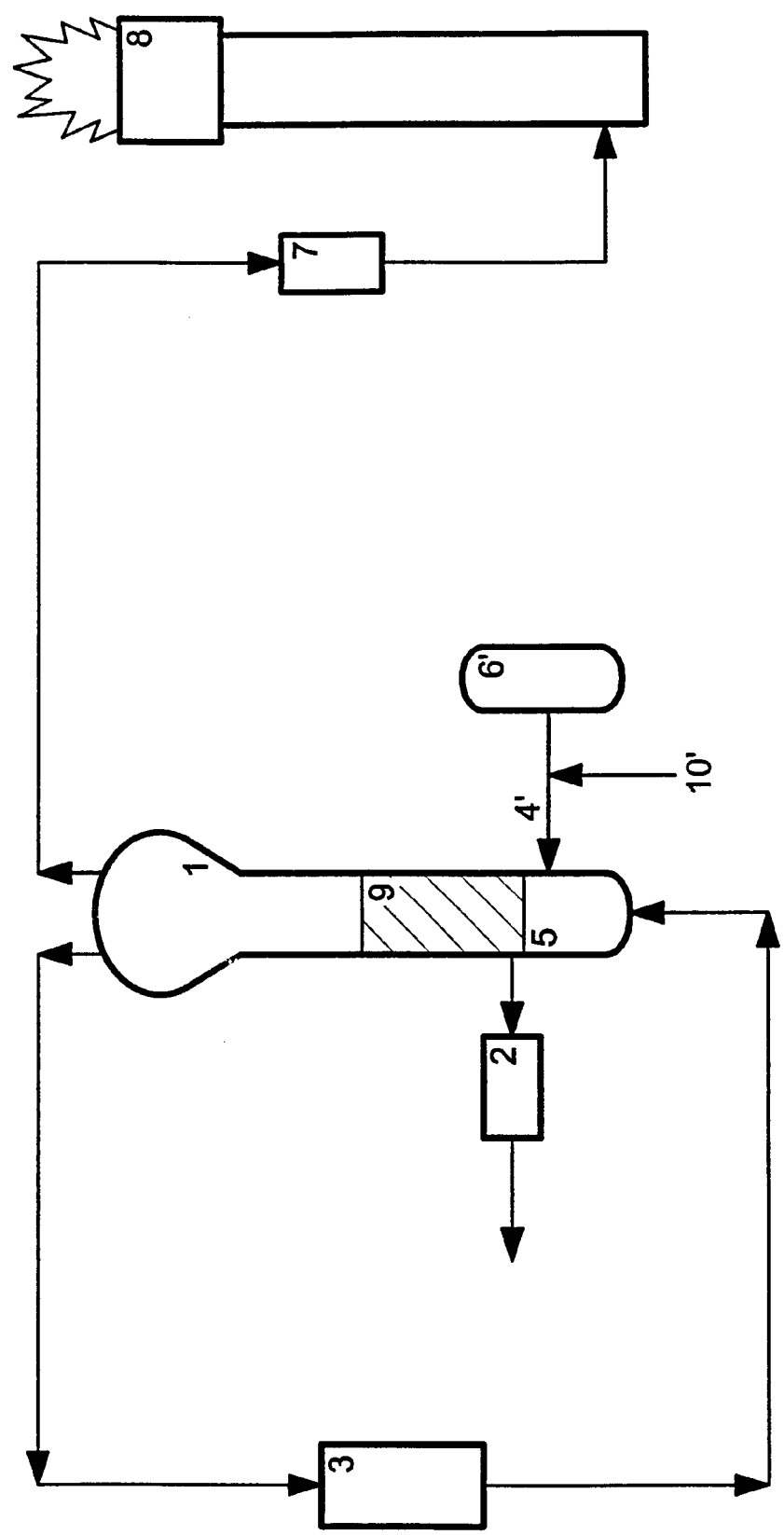

The device installed in order to implement the second aspect of the present invention is represented by FIG. 2. This particular device also comprises a reservoir (6') containing a carrier gas under pressure and connected to the polymerization reactor via the duct (4') into which the deactivating agent (10') can be introduced.

During an emergency stop of the polymerization reaction, for example the loss of the recirculating device (3), the gaseous content must be evacuated before reaching the melting point of the polymer present in the reactor. The reaction is therefore deactivated by the introduction under the distribution grid of the reactor (5) through a duct (4') of one or more deactivating agents conveyed by the carrier gas present in the reservoir (6').

Initially, the polymerization reactor in operation is at 32 barg and the reservoir of carrier gas ($N_2$) is at about 100 barg. During the emergency stop, the poison (CO) should be introduced into the reactor uniformly along the height of the bed via the duct (4'). In one of the most critical cases, the maximum duration is 141 seconds, in order to prevent the melting of the product of the reaction inside the reactor. This results in an initial "blowdown" rate of 211 t/h, which is much too high given the optimal capacity of the burner (smokeless rate) of 20 t/h.

In order to delay this discharge, the reservoir (6'), pressurized with $N_2$, is used, which makes it possible to inject the CO along the entire height of the bed in 141 seconds (in order to prevent the melting of the product of the reaction inside the reactor).

In summary, the CO is sent into the reactor and is dispersed inside the latter via the flow of $N_2$ and it is unnecessary to create a depressurization of the reactor causing a reactor discharge rate of 211 t/h in order to disperse the poison. The discharge of the reagent gas can then be regulated (given that the catalyst is no longer active) to 20 t/h via the valve upstream from the burner.

The pressure and the volume of the reservoir (6') have been defined so as to allow a uniform distribution of the poison in the bed of the reactor. Moreover, this reservoir makes it possible to ensure a discharge that does not exceed the optimal capacity of 20 t/h of the burner.

The dimensions of this reservoir are the following:

diameter: 1,829 mm length: 7,620 mm calculated pressure: 118 barg calculated temperature: −20° C. and 180° C.

total volume: 20 $m^3$.

What is claimed is:

1. Process for the emergency stopping of a polymerization reaction in the gas phase, comprising the injection of a poison of the reaction into a polymerization reactor and the evacuation of the gaseous content of the polymerization reactor via delaying means to a burner at the maximum limited feed rate, characterized in that the delaying means simultaneously serve to obtain a homogeneous distribution of the poison of the reaction inside the polymerization reactor so as to interrupt the polymerization reaction, and to regulate the flow of the gasses evacuated to the burner so as not to exceed the maximum feed rate of the burner.

2. Process according to claim 1, wherein means for delaying the evacuation comprise a buffer reservoir, with a pressure lower than that prevailing in the polymerization reactor, placed between the polymerization reactor and the burner, and means for regulating the gas discharge rate at the outlet of the buffer reservoir, the contents of the reactor being homogeneously mixed with the poison of the reaction by a sudden expansion of the gasses contained in the polymerization reactor to the buffer reservoir by equalizing the pressure between said reactor and said buffer reservoir, and the regulating means serving to reduce and to regulate the feed rate of the burner.

3. Process according to claim 2, wherein the buffer reservoir has a volume between 0.5 and 5 times that of the polymerization reactor.

4. Process according to claim 2, wherein the buffer reservoir at rest is under slight pressure from nitrogen, preferably from 0.01 to 1 bar.

5. Process according to claim 1, wherein the means for delaying the evacuation comprise a reservoir containing a carrier gas, with a pressure higher than that prevailing in the polymerization reactor, placed upstream from the polymerization reactor, and means for regulating the discharge rate at the outlet of the reactor, the contents of the reactor being homogeneously mixed with the poison of the reaction by the sudden expansion of the carrier gas inside the reactor, and the regulating means serving to reduce and regulate the feed rate of the burner.

6. Process according to claim 5, wherein the pressure in the carrier gas reservoir is 2 to 10 times higher than the initial pressure in the reactor.

7. Process according to claim 5, wherein the carrier gas is an inert gas, preferably chosen from nitrogen, helium, argon or their mixtures.

8. Process according to claim 5, wherein the carrier gas is introduced simultaneously or in a mixture with the poison of the reaction.

9. Process according claim 5, wherein the quantity and the pressure of the carrier gas introduced into the polymerization reactor is enough to homogeneously distribute the poison of the reaction in the bed of the reactor.

10. Process according to claim 1, wherein the polymerization reaction in the gas phase is a reaction for polymerizing or copolymerizing olefin monomers in a fluidized bed in the presence of a catalyst.

11. Process according to claim 10, wherein the poison of the reaction is a reversible or irreversible agent for deactivating the catalyst.

12. Process according to claim 11, wherein the irreversible deactivating agent is chosen from oxygen and air.

13. Process according to claim 11, wherein the reversible deactivating agent is chosen from carbon monoxide, carbon dioxide or their mixtures.

14. Process according to claim 11, wherein the deactivating agent is used in stoichiometric excess relative to the transition metal present in the catalyst.

* * * * *